United States Patent
Ammanamanchi et al.

(10) Patent No.: US 12,316,155 B2
(45) Date of Patent: May 27, 2025

(54) SYSTEMS AND METHODS FOR CONFIGURABLE DC-DC CONVERTER AND BATTERY CHARGER

(71) Applicant: BorgWarner Luxembourg Automotive Systems S.A., Bascharage (LU)

(72) Inventors: Venkata Jaya Sai Praneeth Ammanamanchi, Lamadelaine (LU); Alexandre M. S. Reis, Westfield, IN (US); Julien Schmitt, Kuntzig (FR)

(73) Assignee: BorgWarner Luxembourg Automotive Systems S.A., Bascharage (LU)

( * ) Notice: Subject to any disclaimer, the term of this patent is extended or adjusted under 35 U.S.C. 154(b) by 599 days.

(21) Appl. No.: 17/663,977

(22) Filed: May 18, 2022

(65) Prior Publication Data
US 2023/0378795 A1     Nov. 23, 2023

(51) Int. Cl.
| | |
|---|---|
| H02J 7/04 | (2006.01) |
| B60L 53/16 | (2019.01) |
| H02J 7/00 | (2006.01) |
| H02M 1/00 | (2006.01) |
| H02M 1/42 | (2007.01) |

(Continued)

(52) U.S. Cl.
CPC ........ *H02J 7/007182* (2020.01); *B60L 53/16* (2019.02); *H02M 1/0085* (2021.05); *H02M 1/4208* (2013.01); *H02M 3/04* (2013.01); *H02M 7/68* (2013.01)

(58) Field of Classification Search
None
See application file for complete search history.

(56) References Cited

U.S. PATENT DOCUMENTS

| | | | |
|---|---|---|---|
| 7,030,512 B2 | 4/2006 | Krein | |
| 2013/0107581 A1* | 5/2013 | Krause | H02M 7/217 363/17 |

(Continued)

FOREIGN PATENT DOCUMENTS

| | | |
|---|---|---|
| CN | 102195330 A | 9/2011 |
| DE | 102017213145 A1 | 1/2019 |
| WO | 2021051776 A1 | 3/2021 |

OTHER PUBLICATIONS

Deshang Sha, Zhiqiang Guo and Xiaozhong Liao, "Control Strategy for Input-Parallel-Output-Parallel Connected High Frequency Isolated Inverter Modules", IEEE Transactions on Power Electronics, vol. 26, No. 8, Aug. 2011, pp. 2237-2248, China.

(Continued)

*Primary Examiner* — Arun C Williams
(74) *Attorney, Agent, or Firm* — Joshua M. Haines; Bookoff McAndrews, PLLC

(57) ABSTRACT

A system for a direct current (DC) to DC converter, the system comprising one or more transformers, a bridge driver connected to a primary side of the one or more transformers, a first bridge rectifier connected to a secondary side of the one or more transformers, a second bridge rectifier connected to a secondary side of the one or more transformers, and one or more secondary configuration switches operable to configure the first bridge rectifier and the second bridge rectifier into each of a single rectifier configuration, a parallel rectifier configuration, and a series rectifier configuration.

20 Claims, 13 Drawing Sheets

(51) Int. Cl.
 *H02M 3/04* (2006.01)
 *H02M 7/68* (2006.01)

(56) References Cited

U.S. PATENT DOCUMENTS

2018/0222333 A1 8/2018 Khaligh et al.
2021/0155100 A1 5/2021 Khaligh et al.

OTHER PUBLICATIONS

Yuma Murakawa and Takashi Hikihara, "Output Series-Parallel Connection of Passivity-Based Controlled DC-DC Converters: Generalization of Asymptotic Stability", IEEE, Jan. 28, 2021, pp. 1-10.
Zhiqiang Guo, Deshang Sha and Xiaozhong Liao, "Input Voltage Sharing Control for Input-Series-Output Parallel DC-DC Converters without Input Voltage Sensors, Journal of Power Electronics", vol. 12, No. 1, JPE Dec. 1, 2011, pp. 83-87, Jan. 2012, Beijing, China.
K. Stengert, "On-board 22 KW fast charger "NLG6"," 2013 World Electric Vehicle Symposium and Exhibition (EVS27), 2013, pp. 1-11.
Extended European Search Report in EP Application No. 23170144, dated Sep. 20, 2023 (9 pages).

\* cited by examiner

SYSTEMS AND METHODS FOR CONFIGURABLE DC-DC CONVERTER AND BATTERY CHARGER

TECHNICAL FIELD

Various embodiments of the present disclosure relate generally to systems and methods for a configurable DC-DC converter, and a battery charger including the configurable DC-DC converter for electric vehicles.

BACKGROUND

In the field of battery chargers, a two-stage layout is generally used to meet a requirement for use in automotive vehicles as an onboard charger. These onboard chargers have high power density, with less weight and require less space. The configuration layout used in single-phase or three-phase chargers includes an alternating current (AC) to direct current (DC) Power Factor Correction (PFC) converter at stage I and an isolated DC-DC converter at stage II. Battery chargers are configured for specific applications, and may not operate at a high efficiency for different power requirements.

The present disclosure is directed to overcoming one or more of these above-referenced challenges.

SUMMARY OF THE DISCLOSURE

In some aspects, the techniques described herein relate to a system for a direct current (DC) to DC converter, the system including: one or more transformers; a bridge driver connected to a primary side of the one or more transformers; a first bridge rectifier connected to a secondary side of the one or more transformers; a second bridge rectifier connected to the secondary side of the one or more transformers; and one or more secondary configuration switches operable to configure the first bridge rectifier and the second bridge rectifier into each of a single rectifier configuration, a parallel rectifier configuration, and a series rectifier configuration.

In some aspects, the techniques described herein relate to a system, further including: a controller configured to control the operation of the one or more secondary configuration switches.

In some aspects, the techniques described herein relate to a system, wherein the one or more secondary configuration switches include a first secondary configuration switch, a second secondary configuration switch, and a third secondary configuration switch.

In some aspects, the techniques described herein relate to a system, wherein the controller is configured to control the operation of the one or more secondary configuration switches to configure the first bridge rectifier and the second bridge rectifier in the single rectifier configuration by controlling the first secondary configuration switch to be open, the second secondary configuration switch to be open, and the third secondary configuration switch to be closed.

In some aspects, the techniques described herein relate to a system, wherein the controller is configured to control the operation of the one or more secondary configuration switches to configure the first bridge rectifier and the second bridge rectifier in the parallel rectifier configuration by controlling the first secondary configuration switch to be closed, the second secondary configuration switch to be open, and the third secondary configuration switch to be closed.

In some aspects, the techniques described herein relate to a system, wherein the controller is configured to control the operation of the one or more secondary configuration switches to configure the first bridge rectifier and the second bridge rectifier in the series rectifier configuration by controlling the first secondary configuration switch to be open, the second secondary configuration switch to be closed, and the third secondary configuration switch to be open.

In some aspects, the techniques described herein relate to a system, further including: wherein the controller is further configured to control the operation of the one or more secondary configuration switches to configure the first bridge rectifier and the second bridge rectifier in the single rectifier configuration when a sensed voltage of a battery connected to the DC-DC converter is in a low voltage region, to configure the first bridge rectifier and the second bridge rectifier in the parallel rectifier configuration when the sensed voltage is in a nominal voltage region, and to configure the first bridge rectifier and the second bridge rectifier in the series rectifier configuration when the sensed voltage is in a full voltage region.

In some aspects, the techniques described herein relate to a system, wherein the controller is further configured to control the operation of the bridge driver to operate into each of a half-bridge driver configuration and in a full-bridge driver configuration.

In some aspects, the techniques described herein relate to a system, wherein the controller is further configured to turn off switches of the second bridge rectifier in the single rectifier configuration.

In some aspects, the techniques described herein relate to a system, wherein the DC-DC converter has a voltage operating range from approximately 170V to approximately 850V at a battery interface connected to the first bridge rectifier and the second bridge rectifier.

In some aspects, the techniques described herein relate to a system, further including an alternating current (AC) to direct current (DC) Power Factor Correction (PFC) converter connected to the bridge driver to provide the system as a battery charger.

In some aspects, the techniques described herein relate to a system, further including: a battery connected to the DC-DC converter of the battery charger.

In some aspects, the techniques described herein relate to a system, wherein the battery charger is configured to: receive input AC power through the PFC converter, convert the AC power to DC power, and provide the DC power to the battery to charge the battery, and receive DC power from the battery through the DC-DC converter, convert the DC power to AC power, and provide the AC power through the PFC converter as output AC power.

In some aspects, the techniques described herein relate to a system, wherein the one or more transformers include one or more high-frequency transformers provided in a resonant tank including one or more of a multiple winding transformer or multiple transformers.

In some aspects, the techniques described herein relate to a method for controlling a system including a direct current (DC) to DC converter including one or more transformers, a bridge driver, a first bridge rectifier, a second bridge rectifier, and one or more secondary configuration switches, the method including performing, by a controller, operations including: controlling a switching operation of the one or more secondary configuration switches to configure the first bridge rectifier and the second bridge rectifier into each of a single rectifier configuration, a parallel rectifier configuration, and a series rectifier configuration.

In some aspects, the techniques described herein relate to a method, wherein the operations further include receiving a sensed voltage of a battery connected to the DC-DC converter, and wherein the controlling the switching operation includes controlling the switching operation to configure the first bridge rectifier and the second bridge rectifier in the single rectifier configuration when the sensed voltage is in a low voltage region, to configure the first bridge rectifier and the second bridge rectifier in the parallel rectifier configuration when the sensed voltage is in a nominal voltage region, and to configure the first bridge rectifier and the second bridge rectifier in the series rectifier configuration when the sensed voltage is in a full voltage region.

In some aspects, the techniques described herein relate to a method, wherein the operations further include controlling the operation of the bridge driver to operate in each of a half-bridge driver configuration and in a full-bridge driver configuration.

In some aspects, the techniques described herein relate to a method, wherein the controlling the switching operation of the one or more secondary configuration switches to configure the first bridge rectifier and the second bridge rectifier in the single rectifier configuration includes turning off switches of the second bridge rectifier.

In some aspects, the techniques described herein relate to a method, wherein the controlling the switching operation further includes: receiving input AC power, converting the AC power to DC power, and providing the DC power to a battery to charge the battery, and receiving DC power from the battery, converting the DC power to AC power, and providing the AC power as output AC power.

In some aspects, the techniques described herein relate to a non-transitory computer readable medium storing instructions that, when executed by one or more processors, perform operations including: controlling a switching operation of one or more secondary configuration switches to configure a first bridge rectifier and a second bridge rectifier of a direct current (DC) to DC converter into each of a single rectifier configuration, a parallel rectifier configuration, and a series rectifier configuration.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to at least some of the disclosed systems and methods is a charger that may operate with a wide range of input voltages and generate a wide range of output voltages. The disclosed systems and methods discussed below may operate with a wide range of input voltages and generate a wide range of output voltages.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
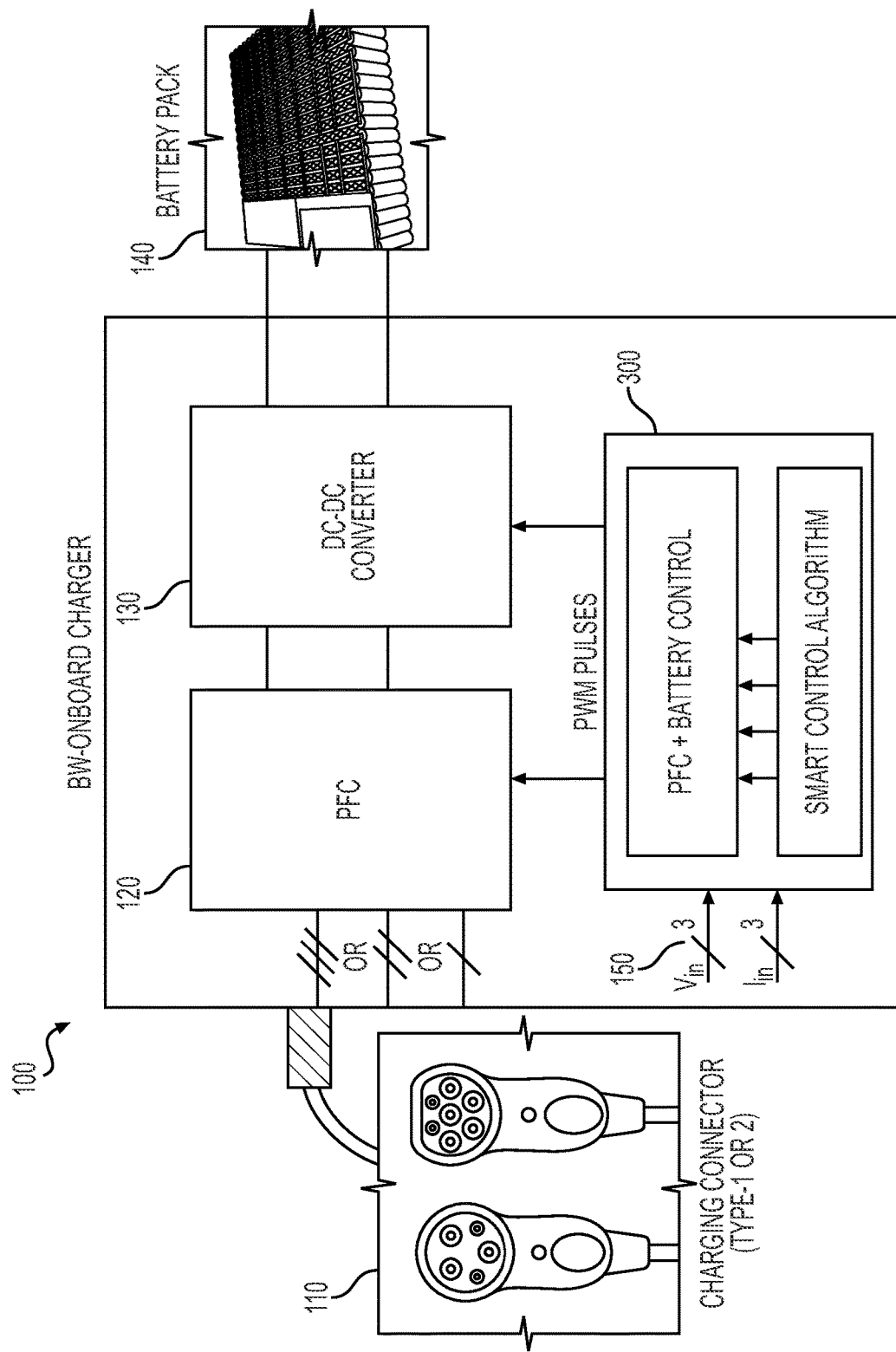
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for a configurable DC-DC converter, and a battery charger including the configurable DC-DC converter for electric vehicles.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

The move in the automotive industry from 400 V to 800 V has created several issues for achieving high efficiency with better power density capabilities. A system with a three-phase input power supply achieving charging capabilities at lower battery voltages is difficult. The few chargers with LLC converters that are compatible with single-phase and three-phase input supply have limitations on the voltage range levels at the input side and at the battery side. An onboard charger with a wide output when a wide range of three-phase input voltages is applied is crucial for component manufacturers. The power levels of onboard chargers are increasing up to 11 kW or 22 kW, and need to be operated with both single-phase and three-phase grid input supply. A potential implementation is to dynamically change the PFC Stage output voltage and the DC-DC stage gain. Unfortunately, due to the wide range of single-phase and three phase input voltages, it is not always possible to impose the desired PFC Stage output voltage. An isolated DC-DC converter used in this structure provides limited power operation in some voltage ranges. On the other side, it is possible to control the gain of the DC-DC converter. Unfortunately, to achieve a good efficiency and a limited power dissipation, it is preferable to use a resonant converter, which must be operated around a resonant frequency. This limitation drastically limits the range of the gain of the DC-DC converter which can be controlled.

A battery charger according to the disclosure may operate with multiple types of AC input power supplies, including single phase, split/dual/two phase, and three-phase power supplies. The charger may be compatible with a wide range of operation. The algorithms may ensure the operation of the converter with wide variations in input voltages to generate a wide range of output voltages. A Capacitor-Inductor-Inductor-Inductor-Capacitor (CLLLC) converter may be used as a second stage converter using a DC link voltage generated from the PFC as the input voltage for the converter. However, the disclosure is not limited thereto.

Figure 2:
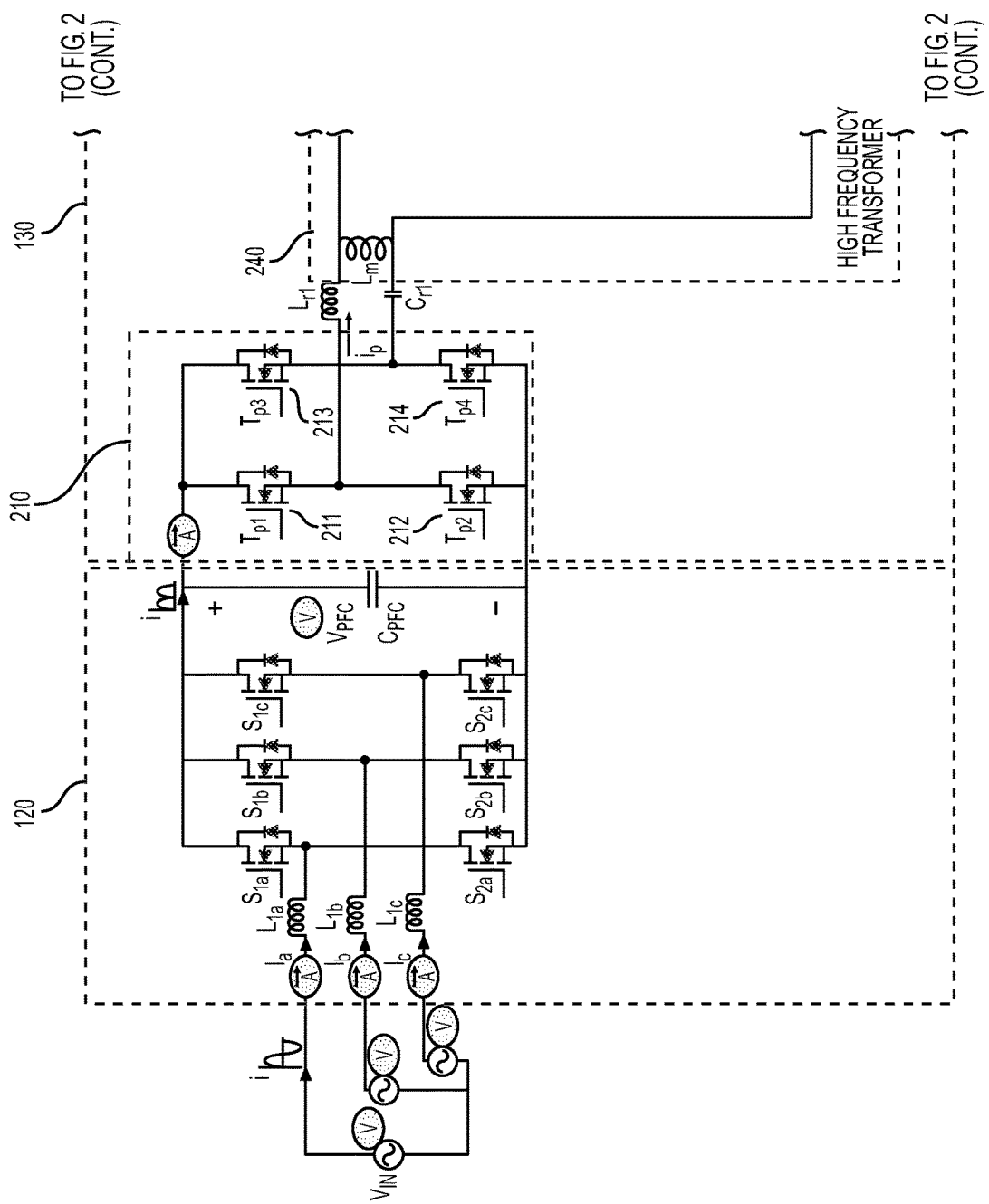
FIG. 2 depicts an exemplary electrical schematic for a battery charger with a configurable DC-DC converter, according to one or more embodiments.
Figure 2:
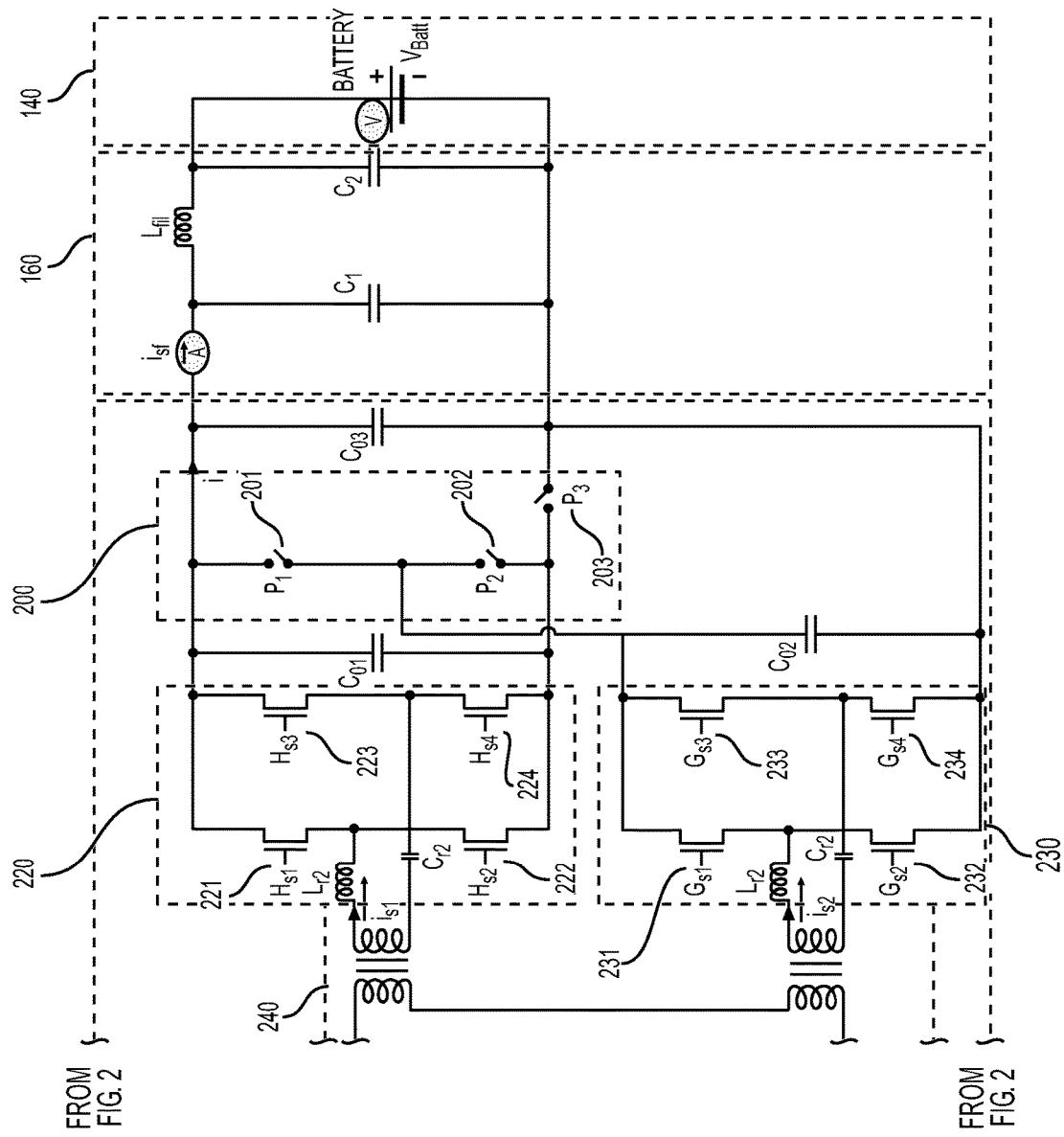

A battery charger according to the disclosure may possess higher efficiency without output voltage or power limitation. An algorithm according to the disclosure may provide operation of the configurable DC-DC converter for different battery voltages. As shown in FIG. 2, the input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery back from minimum voltage to maximum voltage. With a three-phase input voltage, the minimum DC link voltage that can be achieved may be approximately 588 V with a nominal AC input voltage of 240 $V_{rms}$. At a minimum voltage, for example, of 380 V for an 800 V battery pack with a maximum battery pack voltage of 850-925 V, the output of the charger may be difficult to achieve with conventional chargers. Modifications on transformers (turns ratio), resonant tank components (inductors and capacitors), or modes of operation (half-bridge and full-bridge) increase size and primary current yields of chargers.

A battery charger according to the disclosure may have two transformers with primaries connected in series and secondaries with a cascaded full-bridge converter configuration with both connected in series to distribute the desired output voltage. A single transformer with one primary and two secondaries may be used to improve the power density. Various switches connected to the converter may deactivate one of the full bridge rectifiers when the bridge rectifier is not in operation and activate series or parallel combinations in operation. These switches may be electrical, such as MOSFETs or IGBTs, for example, or may be mechanical devices, such as relays, for example. During the higher output voltages to optimize the system to achieve better efficiency, the switches may be turned off and turned on to form a series combination of the converter with voltage divided by the switches.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) operation may be achieved with a designed control strategy for single-phase, two-phase, and three-phase systems. The switches may be any devices, such as GTO, thyristors, or MOSFETs/IGBTs with series diodes, for example. These switches may also be mechanical components (such as relays or contactors) if sufficient failure rates and arcing conditions during operation are met.

A battery charger according to the disclosure may attain lower voltage across each switch on the secondary side with enhanced performance for the charger, and may allow lower voltage devices on both the secondary side bridge rectifiers.

FIG. 1 depicts an exemplary system infrastructure for a battery charger with a configurable DC-DC converter, according to one or more embodiments.

As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, a DC-DC converter 130, and a controller 300 receiving signals from input sensor 150. The battery charger 100 may include or be electrically connectable to a battery 140. The battery charger 100 may be used in automotive vehicles as an onboard charger to transfer power from an external power source through charging connector 110 to battery 140, or to transfer power from battery 140 in a vehicle to grid operation.

FIG. 2 depicts an exemplary electrical schematic for a battery charger with a configurable DC-DC converter, according to one or more embodiments.

As shown in FIG. 2, the PFC converter 120 according to the disclosure may operate with a three-phase input. However, PFC converter 120 may also operate with a two-phase or single-phase input.

All switches described in the disclosure may be any devices, such as GTO, thyristors, or MOSFETs or IGBTs with series diodes, for example. These switches may also be mechanical components (such as relays or contactors) if sufficient failure rates and arcing conditions during operation are met.

PFC converter 120 may include inductors L1$a$, L2$a$, and L3$a$ provided on phases A, B, and C, respectively. Capacitor Cpfc may be provided as a DC link capacitor at an output of PFC converter 120 with a voltage Vpfc to an input of DC-DC converter 130.

DC-DC converter 130 may be operable to isolate the PFC converter 120 from battery 140. For example, DC-DC converter 130 may be a CLLLC converter, or any suitable DC-DC converter.

The battery charger 100 may be a system including PFC converter 120. PFC converter 120 may include a first (e.g. A) phase switch group (e.g. switches S1a and S2a) connected to a first node from connector 110 to receive power from a first phase of a voltage source (e.g. Vin,a). The system may include a second (e.g. B) phase switch group (e.g. switches S1b and S2b) connected to a second node from connector 110 to receive power from a second phase of a voltage source (e.g. Vin,b). The system may include a third (e.g. C) phase switch group (e.g. switches S1c and S2c) connected to a third node from connector 110 to receive power from a third phase of a voltage source (e.g. Vin,c).

The battery charger 100 may include a controller 300 (see FIG. 3) configured to control an operation of the first, second, and third phase switch groups (e.g. S1a and S2a, S1b and S2b, and S1c and S2c).

DC-DC converter 130 may be connected to outputs of the first, second, and third phase switch groups. A voltage source may be connected to one or more of the first, second, and third nodes of the PFC converter 120, and a battery 140 may be connected to an output of the DC-DC converter 130. Additionally, a filter 160 may be provided between the DC-DC converter 130 and battery 140.

The battery charger 100 may operate bidirectionally. A vehicle to grid (V2G) operation may be achieved with a designed control strategy for multiple voltages. The PFC converter 120 may be configured to receive DC power from the battery 140 through the DC-DC converter 130, convert the DC power to AC power, and provide the AC power through one or more of the first, second, and third nodes. The controller 300 may be designed with an algorithm to control an operation of the first, second, and third phase switch groups to provide the AC power through the one or more of the first, second, and third nodes.

DC-DC converter 130 may include secondary configuration switches 200, bridge driver 210, first bridge rectifier 220, second bridge rectifier 230, and transformer 240.

Bridge driver 210 may include primary first switch 211 (Tp1), primary second switch 212 (Tp2), primary third switch 213 (Tp3), and primary fourth switch 214 (Tp4). Bridge driver 210 may be operated as a full bridge driver or a half bridge driver, and transmit power as a square-wave signal from PFC converter 120 to transformer 240. Transformer 240 may be a high-frequency transformer and may be a single transformer with multiple coils or windings, multiple transformers with single coils or windings, or any combination thereof.

Transformer 240 may be connected to first bridge rectifier 220 and second bridge rectifier 230. The first bridge rectifier 220 may include first switch 221 (Hs1), second switch 222 (Hs2), third switch 223 (Hs3), and fourth switch 224 (Hs4). The second bridge rectifier 230 may include first switch 231 (Gs1), second switch 232 (Gs2), third switch 233 (Gs3), and fourth switch 234 (Gs4). The switches of the first bridge rectifier 220 and the second bridge rectifier 230 may convert the square-wave signal to DC power.

Secondary configuration switches 200 may include first secondary configuration switch 201 (P1), second secondary configuration switch 202 (P2), and third secondary configuration switch 203 (P3). Secondary configuration switches 200 may be opened and closed as applicable to configure the first bridge rectifier 220 and the second bridge rectifier 230 into each of a single rectifier configuration (see FIG. 4), a parallel rectifier configuration (see FIG. 5), and a series rectifier configuration (see FIG. 6). Opening and closing of secondary configuration switches 200 may be controlled by controller 300. The controller 300 may control the operation of secondary configuration switches 200 based on one or more of a voltage of battery 140, an input grid voltage, a DC link voltage, a power requirement, and a state of charge of battery 140. However, the disclosure is not limited thereto, and controller 300 may control the operation of secondary configuration switches 200 based on any appropriate signal.

In the single rectifier configuration (see FIG. 4), either first bridge rectifier 220 or second bridge rectifier 230 may be used without using the other of the first bridge rectifier 220 or the second bridge rectifier 230. In the single rectifier configuration, the secondary configuration switches 200 and unused first bridge rectifier 220 or unused second bridge rectifier 230 may be operated such that all current passes through the first bridge rectifier 220 in use or second bridge rectifier 230 in use, and no current passes through the unused first bridge rectifier 220 or unused second bridge rectifier 230.

In the parallel rectifier configuration (see FIG. 5), the secondary configuration switches 200 and first bridge rectifier 220 and second bridge rectifier 230 may be operated such that current passes through the first bridge rectifier 220 and second bridge rectifier 230 in parallel.

In the series rectifier configuration (see FIG. 6), the secondary configuration switches 200 and first bridge rectifier 220 and second bridge rectifier 230 may be operated such that current passes through the first bridge rectifier 220 and second bridge rectifier 230 in series.

FIG. 2 illustrates two bridge rectifiers, first bridge rectifier 220 and second bridge rectifier 230, with secondary configuration switches 200 on a secondary side of transformer 240. However, DC-DC converter 130 may include more than two bridge rectifiers on a secondary side of transformer 240 with any number of secondary configuration switches 200 as needed to meet requirements of the battery charger 100.

The controller 300 may be designed with and/or configured to run an algorithm for control of the first, second, and third phase switches, secondary configuration switches 200, switches of the first bridge rectifier 220, and switches of the second bridge rectifier 230.

Figure 3:
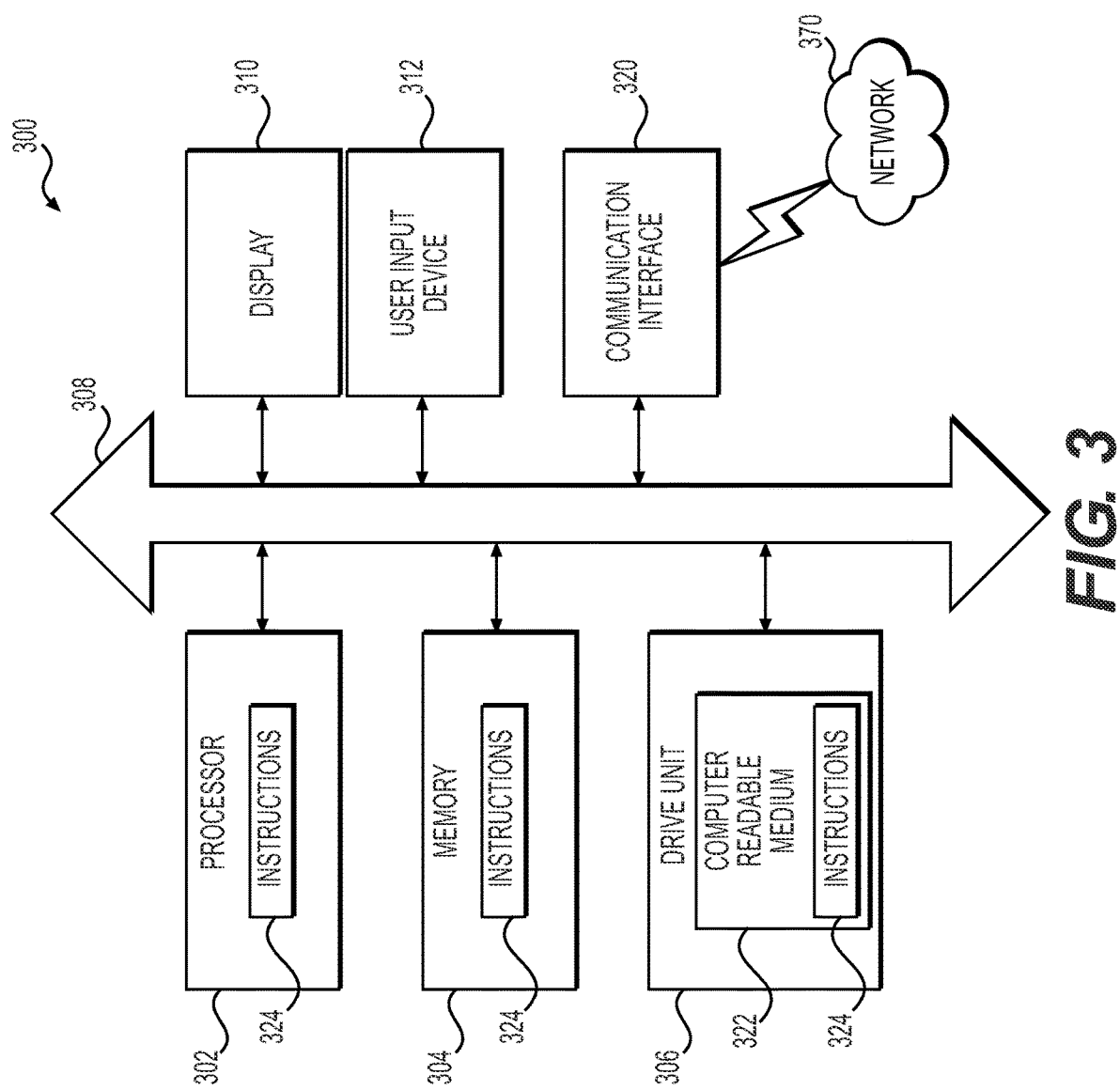
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
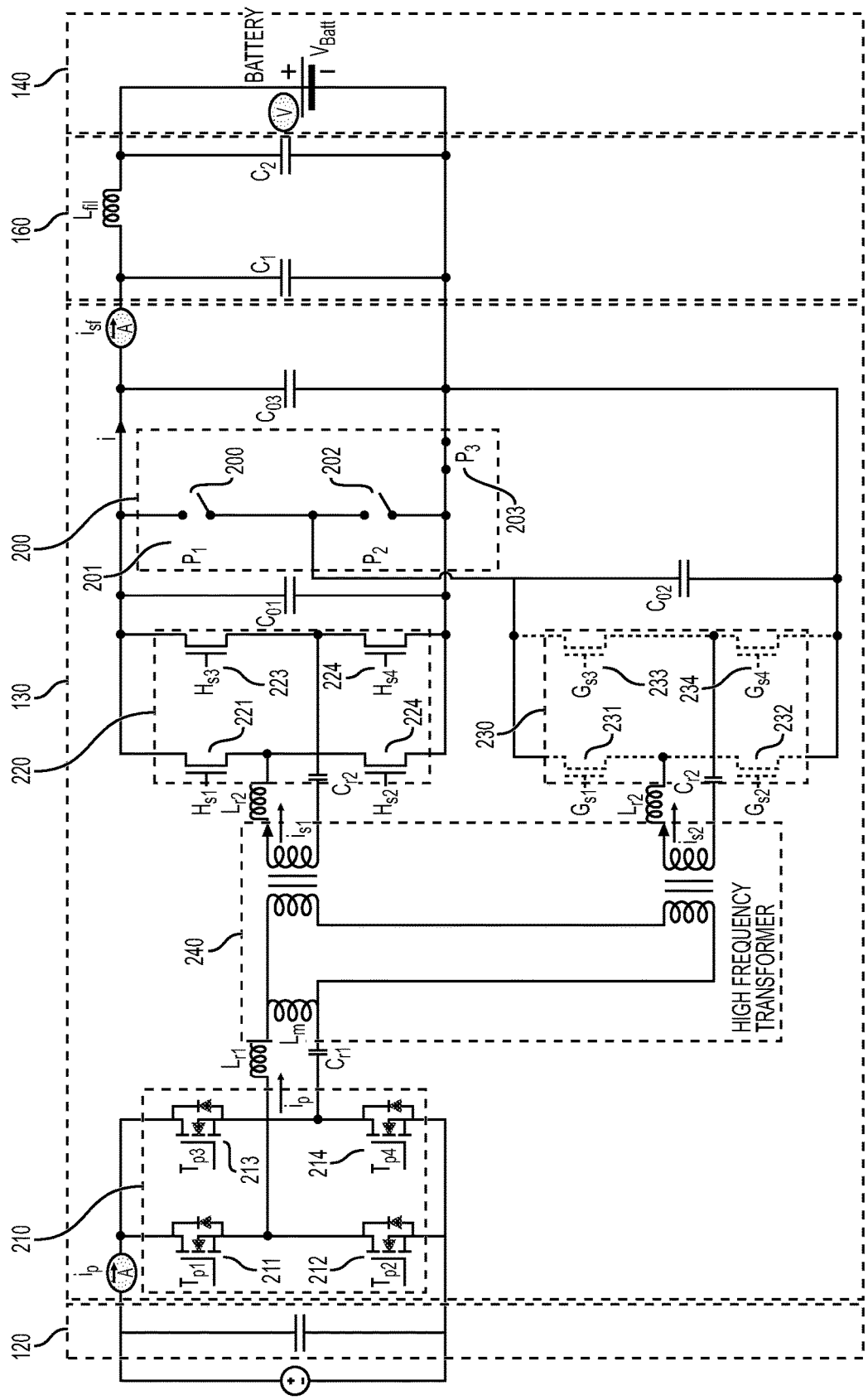
FIG. 4 depicts an exemplary electrical schematic for a battery charger with a configurable DC-DC converter in a full bridge driver primary, single rectifier secondary operation, according to one or more embodiments.

FIG. 4 depicts an exemplary electrical schematic for a battery charger with a configurable DC-DC converter in a full bridge driver primary, single rectifier secondary operation, according to one or more embodiments. The structure of battery charger 100 is described above, with reference to FIG. 2.

As shown in FIG. 4, battery charger 100 may be configured to operate in a full bridge driver configuration on a primary side of transformer 240, and a single rectifier configuration on a secondary side of transformer 240. For the full bridge driver primary, single rectifier secondary operation, first secondary configuration switch 201 may be opened (turned off), second secondary configuration switch 202 may be opened, and third secondary configuration switch 203 may be closed (turned on). Also, second bridge rectifier 230 switches, including first switch 231, second switch 232, third switch 233, and fourth switch 234, may be turned off. For example, the full bridge driver primary, single rectifier secondary operation may be used in a low-voltage region 810 of a high-voltage region 800 (see FIG. 8) when a voltage of battery 140 ranges from 360 V to 450 V, for example, and in a low-voltage region 900 (see FIG. 9) when a voltage of battery 140 ranges from 170 V to 450 V, for example. However, the disclosure is not limited thereto. The full bridge driver primary, single rectifier secondary operation may be used for any operation of the battery charger 100 as desired, and the low-voltage region 810 and or low-voltage region 900 may range between any appropriate voltage levels.

Additionally or alternatively, the second bridge rectifier 230 may be used as the single rectifier. Here, rather than turning off the second bridge rectifier 230 switches, the first bridge rectifier 220 switches, including first switch 221, second switch 222, third switch 223, and fourth switch 224, may be turned off. When the second bridge rectifier 230 is used as the single rectifier and the first bridge rectifier 220 switches are turned off, first secondary configuration switch 201 may be closed (turned on), second secondary configuration switch 202 may be opened (turned off), and third secondary configuration switch 203 may be opened.

Figure 5:
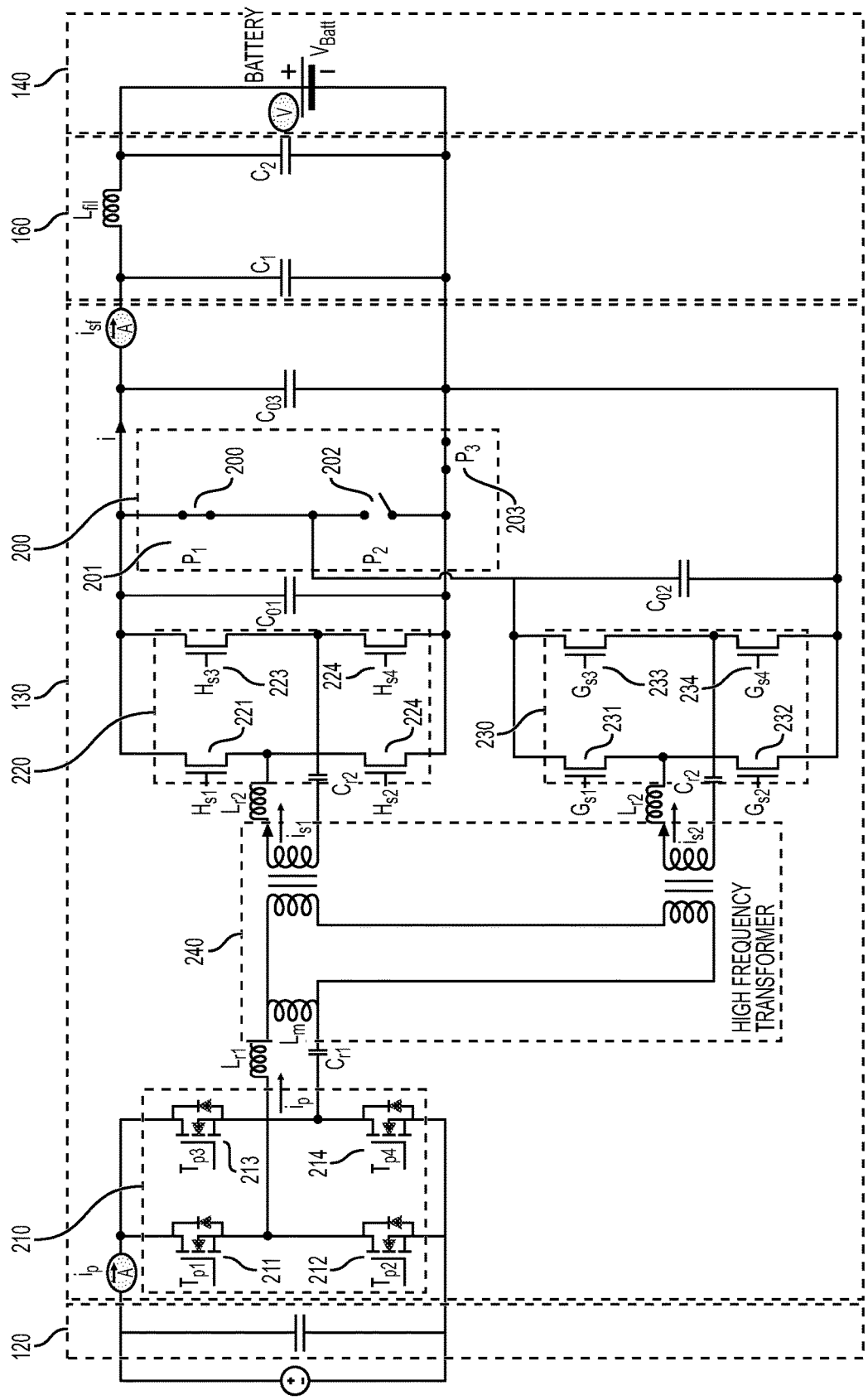
FIG. 5 depicts an exemplary electrical schematic for a battery charger with a configurable DC-DC converter in a full bridge driver primary, parallel rectifier secondary operation, according to one or more embodiments.

FIG. 5 depicts an exemplary electrical schematic for a battery charger with a configurable DC-DC converter in a full bridge driver primary, parallel rectifier secondary operation, according to one or more embodiments. The structure of battery charger 100 is described above, with reference to FIG. 2.

As shown in FIG. 5, battery charger 100 may be configured to operate in a full bridge driver configuration on a primary side of transformer 240, and a parallel rectifier configuration on a secondary side of transformer 240. For the full bridge driver primary, parallel rectifier secondary operation, first secondary configuration switch 201 may be closed (turned on), second secondary configuration switch 202 may be opened (turned off), and third secondary configuration switch 203 may be closed. For example, the full bridge driver primary, parallel rectifier secondary operation may be used in a nominal-voltage region 820 (see FIG. 8) when a voltage of battery 140 ranges from 450 V to 650 V, for example. However, the disclosure is not limited thereto. The full bridge driver primary, parallel rectifier secondary operation may be used for any operation of the battery charger 100 as desired, and the nominal-voltage region 820 may range between any appropriate voltage levels.

Figure 6:
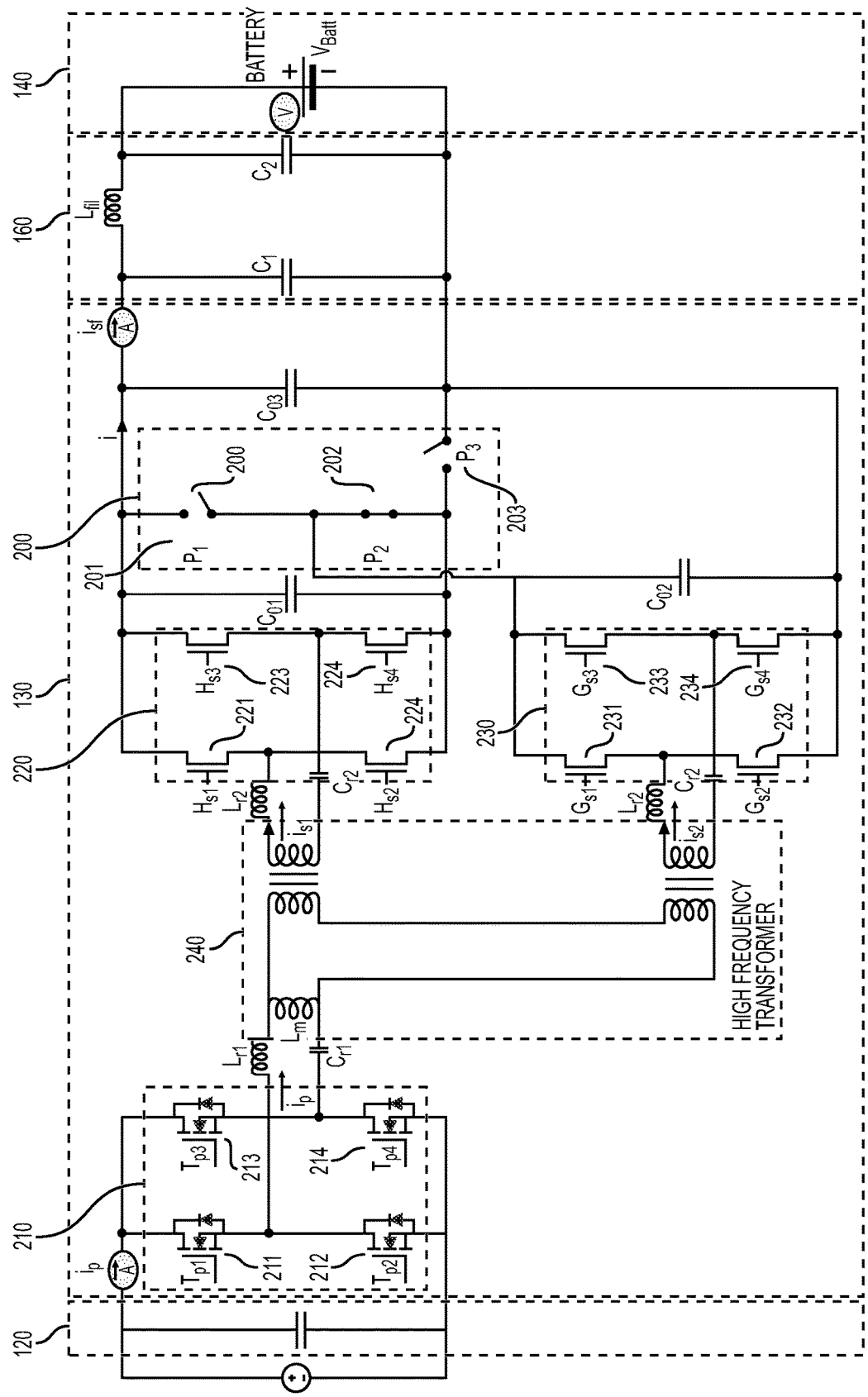
FIG. 6 depicts an exemplary electrical schematic for a battery charger with a configurable DC-DC converter in a full bridge driver primary, series rectifier secondary operation, according to one or more embodiments.

FIG. 6 depicts an exemplary electrical schematic for a battery charger with a configurable DC-DC converter in a full bridge driver primary, series rectifier secondary operation, according to one or more embodiments. The structure of battery charger 100 is described above, with reference to FIG. 2.

As shown in FIG. 6, battery charger 100 may be configured to operate in a full bridge driver configuration on a primary side of transformer 240, and a series rectifier configuration on a secondary side of transformer 240. For the full bridge driver primary, series rectifier secondary operation, first secondary configuration switch 201 may be opened (turned off), second secondary configuration switch 202 may be closed (turned on), and third secondary configuration switch 203 may be opened. For example, the full bridge driver primary, series rectifier secondary operation may be used in a full-voltage region 830 (see FIG. 8) when a voltage of battery 140 ranges from 650 V to 850 V, for example. However, the disclosure is not limited thereto. The full bridge driver primary, series rectifier secondary operation may be used for any operation of the battery charger 100 as desired, and the full-voltage region 830 may range between any appropriate voltage levels.

Figure 7:
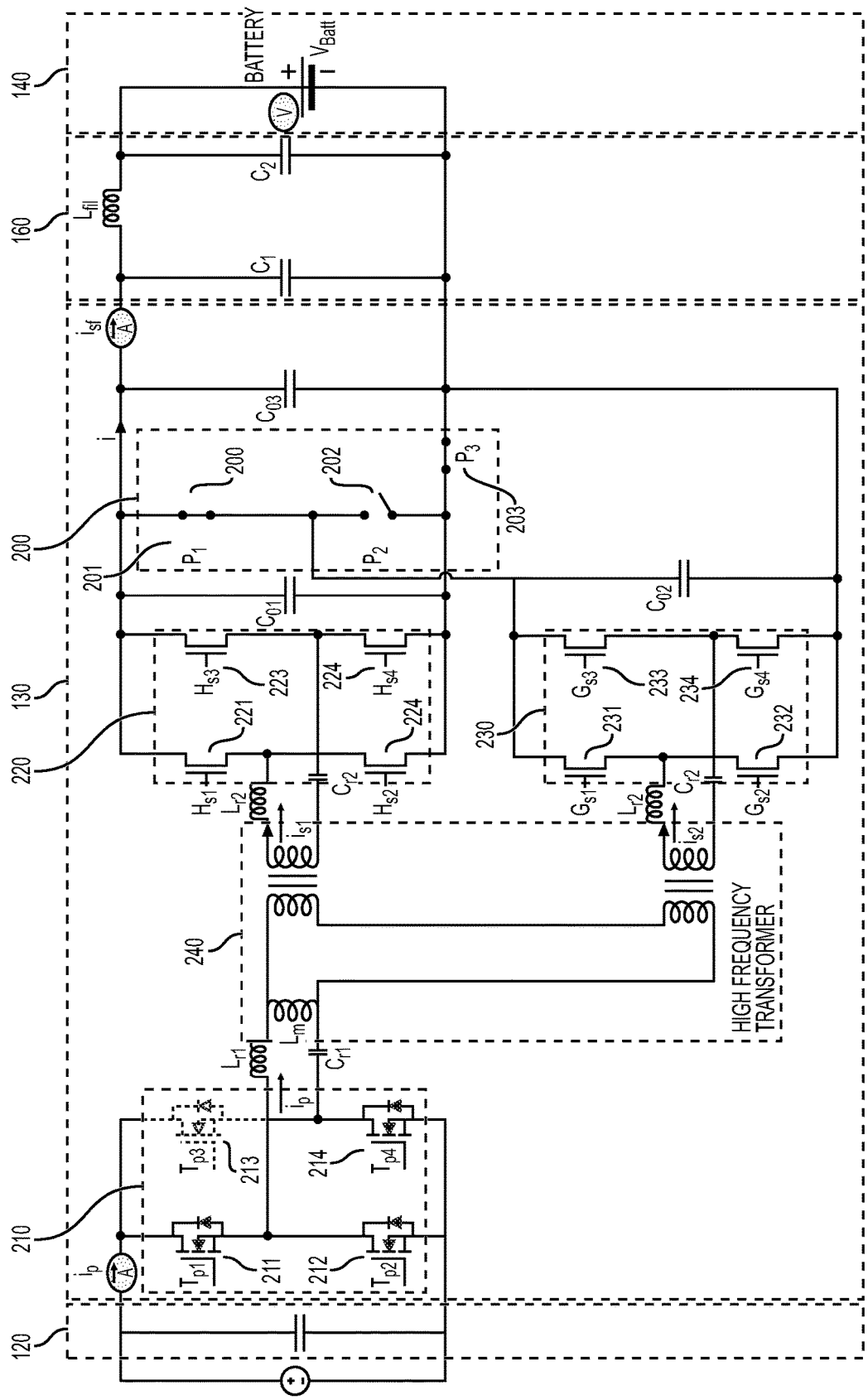
FIG. 7 depicts an exemplary electrical schematic for a battery charger with a configurable DC-DC converter in a half bridge driver primary, parallel rectifier secondary operation, according to one or more embodiments.

FIG. 7 depicts an exemplary electrical schematic for a battery charger with a configurable DC-DC converter in a half bridge driver primary, parallel rectifier secondary operation, according to one or more embodiments. The structure of battery charger 100 is described above, with reference to FIG. 2.

As shown in FIG. 7, battery charger 100 may be configured to operate in a half bridge driver configuration on a primary side of transformer 240, and a parallel rectifier configuration on a secondary side of transformer 240. For the half bridge driver primary, parallel rectifier secondary operation, first secondary configuration switch 201 may be closed (turned on), second secondary configuration switch 202 may be opened (turned off), and third secondary configuration switch 203 may be closed. For the half bridge driver primary, switches on the primary side of transformer 240 may be controlled so that primary first switch 211 primary second switch 212 are operated to generate a voltage signal, primary third switch 213 is opened, and primary fourth switch 214 is closed. The half bridge driver primary, parallel rectifier secondary operation may be used in a nominal-voltage region 820 (see FIG. 8) when a voltage of battery 140 ranges from 450 V to 650 V, for example. However, the disclosure is not limited thereto. The half bridge driver primary, parallel rectifier secondary operation may be used for any operation of the battery charger 100 as desired, and the nominal-voltage region 820 may range between any appropriate voltage levels.

Figure 8:
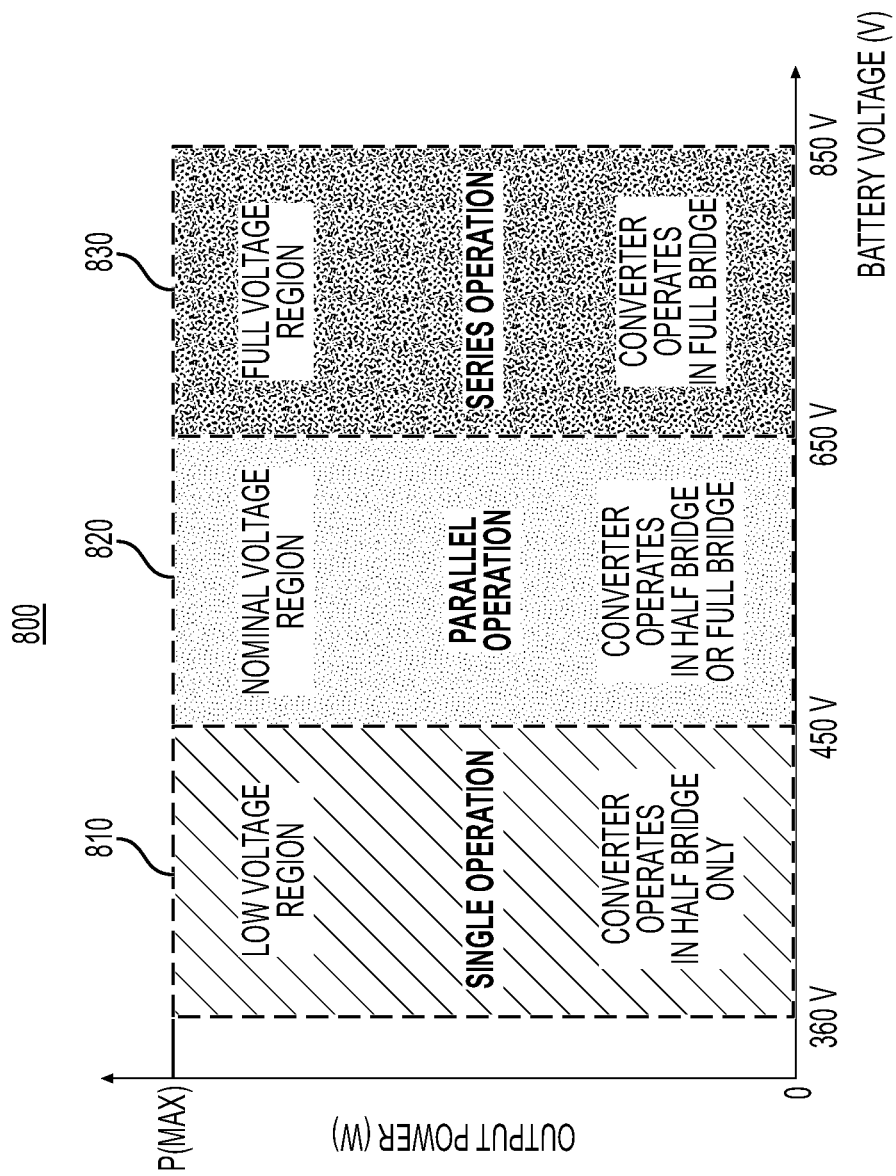
FIG. 8 depicts an exemplary high-voltage operation control for a battery charger with a configurable DC-DC converter, according to one or more embodiments.

FIG. 8 depicts an exemplary operation control for high-voltage region 800 for a battery charger with a configurable DC-DC converter, according to one or more embodiments. The structure of battery charger 100 is described above, with reference to FIG. 2.

As shown in FIG. 8, battery charger 100 and DC-DC converter 130 may be operated in different configurations based on different battery voltages. For example, DC-DC converter 130 may be operated in a half bridge driver primary, single rectifier secondary configuration in a low-voltage region 810 when a voltage of battery 140 is in a first range from 360 V to 450 V. DC-DC converter 130 may be operated in a half bridge driver primary, parallel rectifier secondary configuration or a full bridge driver primary, parallel rectifier secondary configuration in a nominal-voltage region 820 when a voltage of battery 140 is in a second range from 450 V to 650 V. DC-DC converter 130 may be operated in a full bridge driver primary, series rectifier secondary configuration in a full-voltage region 830 when a voltage of battery 140 is in a third range from 650 V to 850 V. Here, the first range as low-voltage region 810, the second range as nominal-voltage region 820, and the third range as full-voltage region 830 are provided as non-overlapping ranges increasing from smallest to largest voltage values.

However, these are merely examples, and the disclosure is not limited to the configurations or voltage levels described above.

Figure 9:
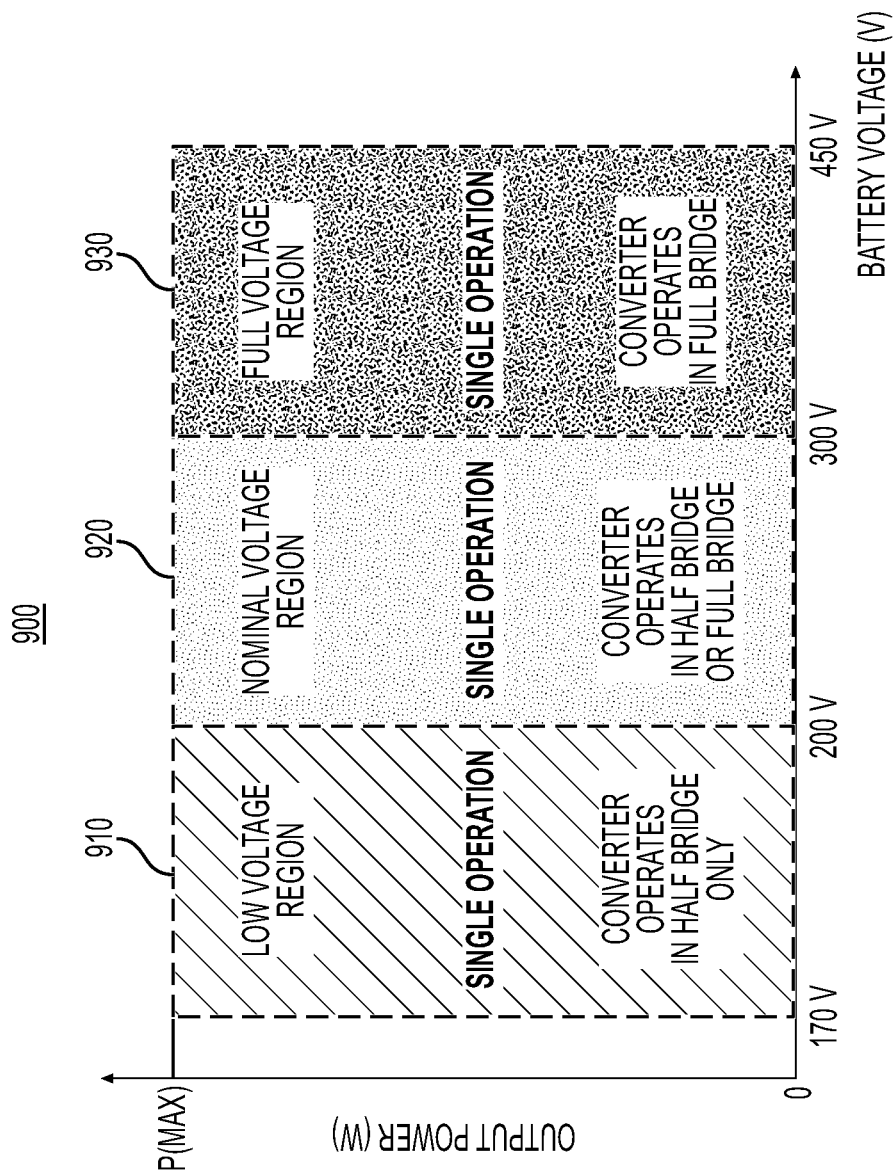
FIG. 9 depicts an exemplary low-voltage operation control for a battery charger with a configurable DC-DC converter, according to one or more embodiments.

FIG. 9 depicts an exemplary operation control for low-voltage region 900 for a battery charger with a configurable DC-DC converter, according to one or more embodiments. The structure of battery charger 100 is described above, with reference to FIG. 2.

As shown in FIG. 9, battery charger 100 and DC-DC converter 130 may be operated in different configurations based on different battery voltages. For example, DC-DC converter 130 may be operated in a half bridge driver primary, single rectifier secondary configuration in a low-voltage region 910 when a voltage of battery 140 is in a first range from 170 V to 200 V. DC-DC converter 130 may be operated in a half bridge driver primary, single rectifier secondary configuration or a full bridge driver primary, single rectifier secondary configuration in a nominal-voltage region 920 when a voltage of battery 140 is in a second range from 200 V to 300 V. DC-DC converter 130 may be operated in a full bridge driver primary, single rectifier secondary configuration in a full-voltage region 930 when a voltage of battery 140 is in a third range from 300 V to 450 V. Here, the first range as low-voltage region 910, the second range as nominal-voltage region 920, and the third range as full-voltage region 930 are provided as non-overlapping ranges increasing from smallest to largest voltage values. However, these are merely examples, and the disclosure is not limited to the configurations or voltage levels described above.

Figure 10:
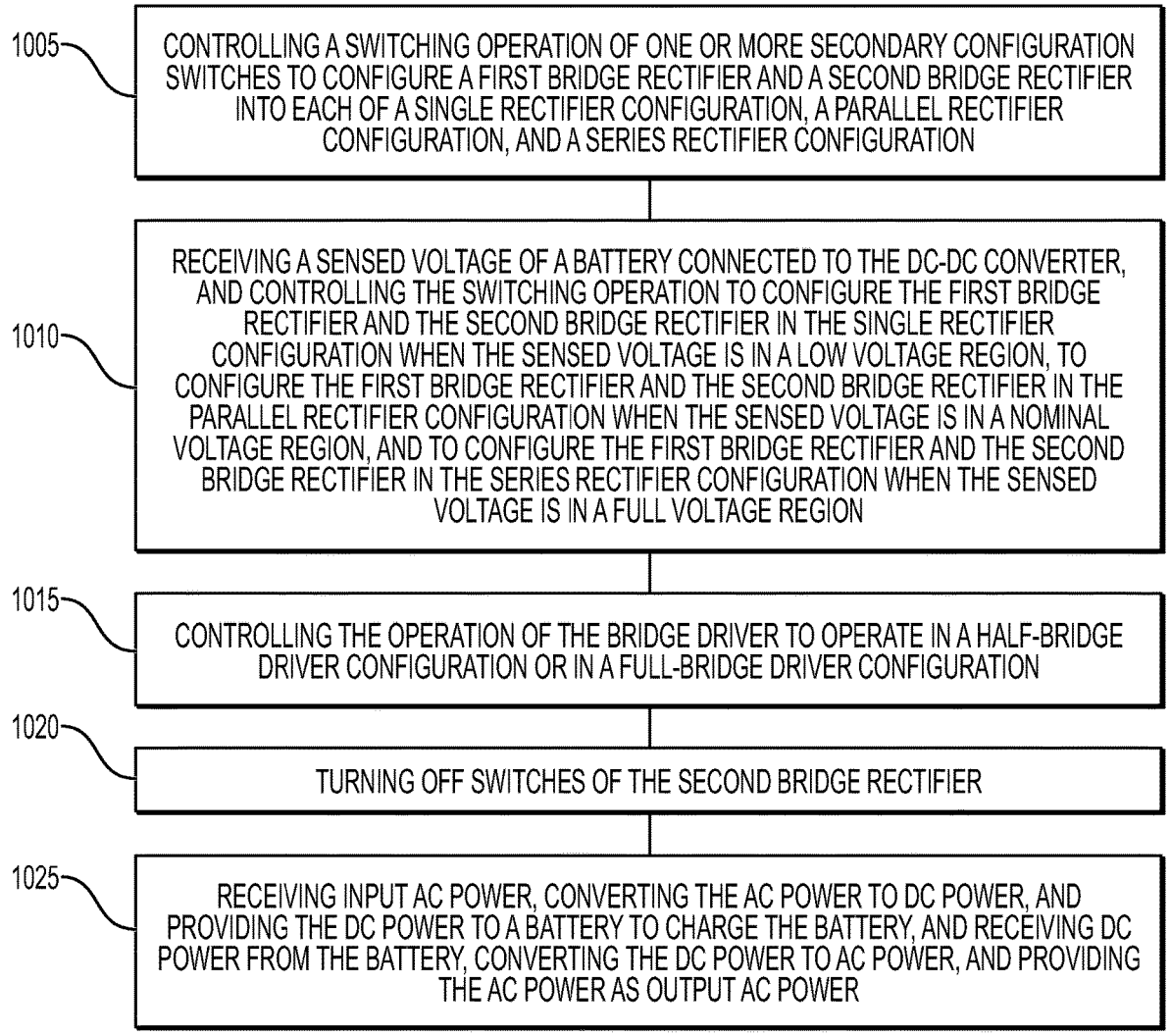
FIG. 10 depicts a flowchart of a method of operating a battery charger with a configurable DC-DC converter, according to one or more embodiments.

FIG. 10 depicts a flowchart of a method of operating a battery charger with a configurable DC-DC converter, according to one or more embodiments.

Method 1000 may control a system including DC-DC converter 130 and may include performing, by controller 300, various operations of method 1000. Operation 1005 may include controlling a switching operation of the one or more secondary configuration switches 200 to configure the first bridge rectifier 220 and the second bridge rectifier 230 into each of a single rectifier configuration, a parallel rectifier configuration, and a series rectifier configuration. Operation 1010 may include receiving a sensed voltage of a battery 140 connected to the DC-DC converter 130, and controlling the switching operation to configure the first bridge rectifier 220 and the second bridge rectifier 230 in the single rectifier configuration when the sensed voltage is in a low voltage region, to configure the first bridge rectifier 220 and the second bridge rectifier 230 in the parallel rectifier configuration when the sensed voltage is in a nominal voltage region, and to configure the first bridge rectifier 220 and the second bridge rectifier 230 in the series rectifier configuration when the sensed voltage is in a full voltage region. Operation 1015 may include controlling the operation of the bridge driver 210 to operate in each of a half-bridge driver configuration and in a full-bridge driver configuration. Operation 1020 may include controlling the switching operation of the one or more secondary configuration switches 200 to configure the first bridge rectifier 220 and the second bridge rectifier 230 in the single rectifier configuration includes turning off switches of the second bridge rectifier 230. Operation 1025 may include receiving input AC power, converting the AC power to DC power, and providing the DC power to a battery 140 to charge the battery 140, and receiving DC power from the battery 140, converting the DC power to AC power, and providing the AC power as output AC power.

Figure 11:
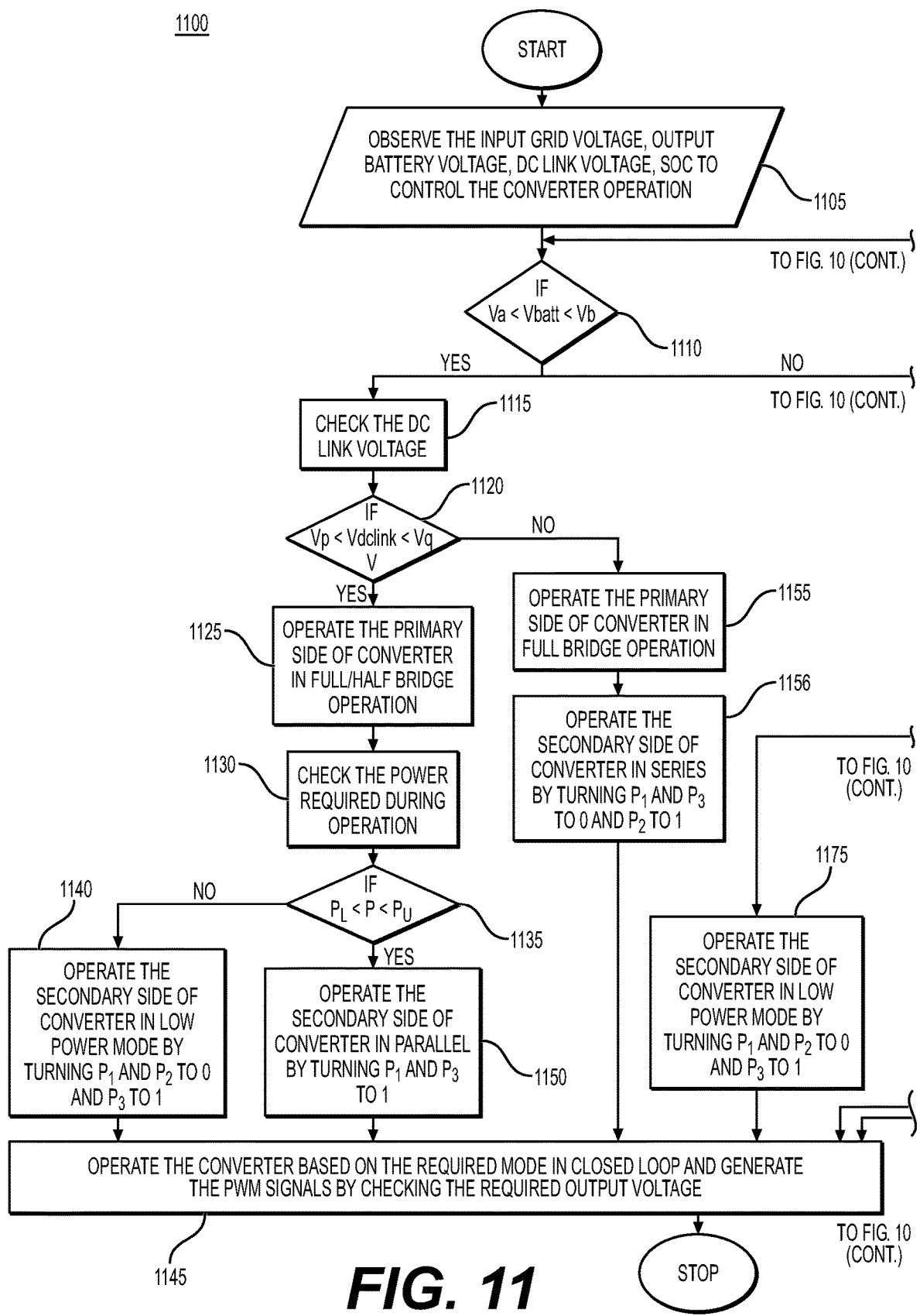
FIG. 11 depicts a flowchart of a method of operating a battery charger with a configurable DC-DC converter, according to one or more embodiments.
Figure 11:
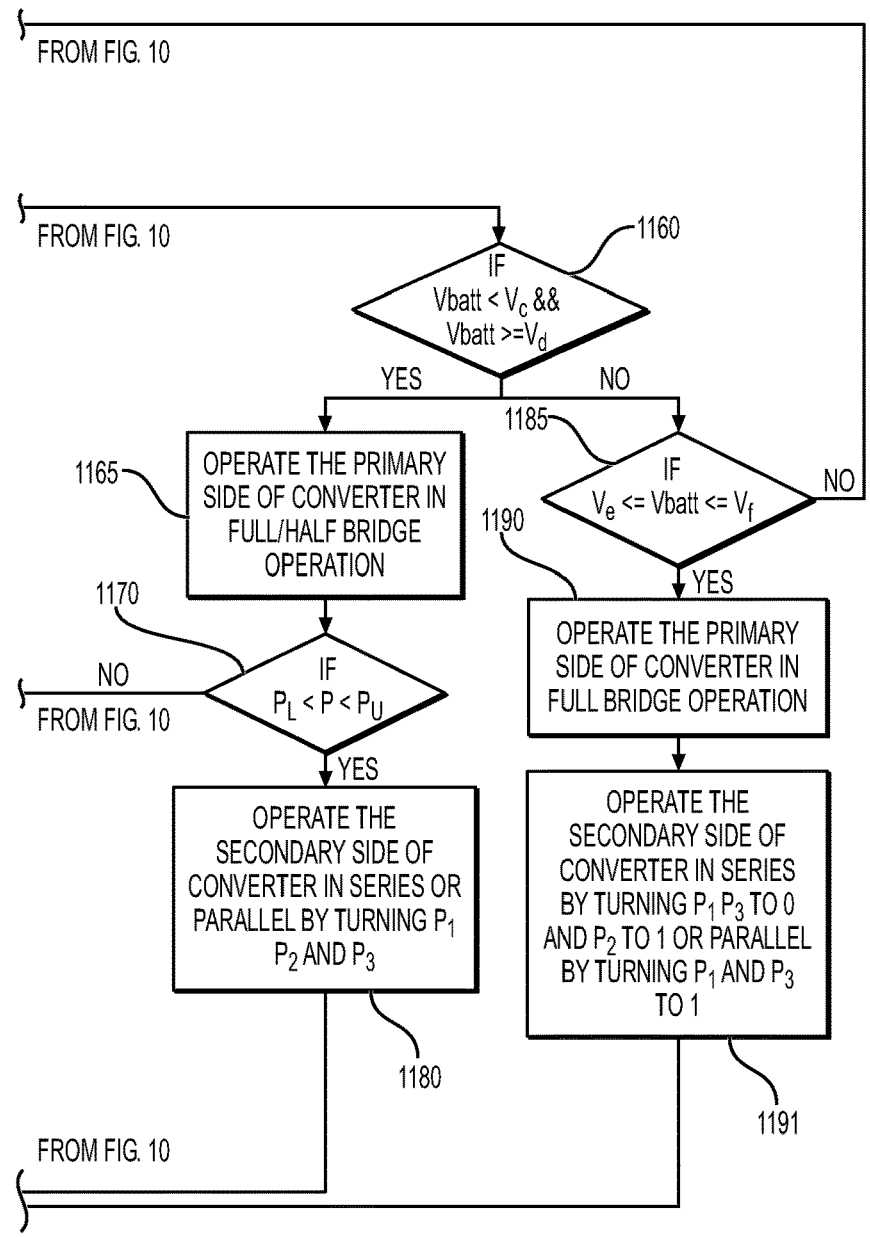

FIG. 11 depicts a flowchart of a method of operating a battery charger with a configurable DC-DC converter, according to one or more embodiments.

Method 1100 may control a system including DC-DC converter 130 and may include performing, by controller 300, various operations of method 1100. Operation 1105 may include observing one or more of a voltage of battery 140, an input grid voltage, a DC link voltage, a power requirement, and a state of charge (SOC) of battery 140. Operation 1110 may include comparing a voltage (Vbatt) of battery 140 with a first reference voltage (Va, for example 360 V as shown in FIG. 8) and a second reference voltage (Vb, for example 450 V as shown in FIG. 8). When Vbatt is greater than Va and less than Vb (yes in operation 1110), operation 1115 may check a DC link voltage (Vdclink, for example, at capacitor Cpfc as shown in FIG. 2). Operation 1120 may include comparing Vdclink with a first operating voltage (Vp, for example, as a 450 V system as shown in FIG. 9) and a second operating voltage (Vq, for example, as an 850 V system as shown in FIG. 8). When Vdclink is greater than Vp and less than Vq (yes in operation 1120), operation 1125 may include controlling the operation of the bridge driver 210 to operate in a half-bridge driver configuration or in a full-bridge driver configuration. Operation 1130 may include observing a power (P) required during an operation of the DC-DC converter 130. Operation 1135 may include comparing P with a lower reference power (PL, for example 3 kW) and an upper reference power (PU, for example 20 kW). When P is less than PL or greater than PU (no in operation 1135), operation 1140 may include operating battery charger 100 in a single rectifier configuration on a secondary side of transformer 240. When P is greater than PL and less than PU (yes in operation 1135), operation 1150 may include operating battery charger 100 in a parallel rectifier configuration on a secondary side of transformer 240. Operation 1145 may include operating battery charger 100 in a closed loop while monitoring Vbatt.

When Vdclink is less than Vp or greater than Vq (no in operation 1120), operation 1155 may include controlling the operation of the bridge driver 210 to operate in a full-bridge driver configuration. Operation 1156 may include operating battery charger 100 in a series rectifier configuration on a secondary side of transformer 240.

When Vbatt is less than Va or greater than Vb (no in operation 1110), operation 1160 may include comparing Vbatt with a third reference voltage (Vc, for example 650 V as shown in FIG. 8) and a fourth reference voltage (Vd, for example 450 V as shown in FIG. 8). When Vbatt is less than Vc and greater than or equal to Vd (yes in operation 1160) operation 1165 may include controlling the operation of the bridge driver 210 to operate in a half-bridge driver configuration or in a full-bridge driver configuration. Operation 1170 may include comparing P with the lower reference power (PL, for example 3 kW) and the upper reference power (PU, for example 20 kW). When P is less than PL or greater than PU (no in operation 1170), operation 1175 may include operating battery charger 100 in a single rectifier configuration on a secondary side of transformer 240. When P is greater than PL and less than PU (yes in operation 1170), operation 1180 may include operating battery charger 100 in a series or parallel rectifier configuration on a secondary side of transformer 240.

When Vbatt is greater than Vc or less than Vd (no in operation 1160) operation 1185 may include comparing Vbatt with a fifth reference voltage (Ve, for example 650 V as shown in FIG. 8) and a sixth reference voltage (Vf, for example 850 V as shown in FIG. 8). When Vbatt is greater than or equal to Ve and less than or equal to Vf (yes in operation 1185), operation 1190 may include controlling the operation of the bridge driver 210 to operate in a full-bridge driver configuration. Operation 1191 may include operating battery charger 100 in a series or parallel rectifier configuration on a secondary side of transformer 240.

When Vbatt is less than Ve or greater than Vf (no in operation 1185), method 1100 may include returning to operation 1110.

Above, several examples of different configurations of DC-DC converter 130 and battery charger 100 are provided. However, the disclosure is not limited to the examples provided above. Any switch combination for bridge driver 210 on the primary side of transformer 240 to configure the primary side of transformer 240 in each of a full bridge driver and half bridge driver configuration may be combined with any switch combination of one or more secondary configuration switches 200 for first bridge rectifier 220 and the second bridge rectifier 230 on the secondary side of transformer 240 to configure the secondary side of transformer 240 into each of a single, parallel, and series rectifier configuration. Additionally, any appropriate voltages or other signals may be used to control the operation of the switches discussed above.

A battery charger 100 according to the disclosure may operate with multiple types of AC input power supplies, including single phase, split/dual/two phase, and three-phase power supplies. The battery charger 100 may be compatible with a wide range of operation. The algorithms may ensure the operation of the DC-DC converter 130 with wide variations in input voltages to generate a wide range of output voltages. By providing different configurations, the battery charger 100 may reduce current delivered to individual devices of battery charger 100 to reduce stress on the devices. A battery charger 100 according to the disclosure may attain lower voltage across each switch on the secondary side of transformer 240 with enhanced performance. This lower voltage across each switch allows the use of lower voltage devices on both of the first bridge rectifier 220 and the second bridge rectifier 230.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for a direct current (DC) to DC converter (DC-DC converter), the system comprising:
   one or more transformers;
   a bridge driver connected to a primary side of the one or more transformers;
   a first bridge rectifier connected to a secondary side of the one or more transformers;
   a second bridge rectifier connected to the secondary side of the one or more transformers;
   one or more secondary configuration switches operable to configure the first bridge rectifier and the second bridge rectifier into each of a single rectifier configuration, a parallel rectifier configuration, and a series rectifier configuration; and
   a controller configured to control the operation of the one or more secondary configuration switches to configure the first bridge rectifier and the second bridge rectifier in the single rectifier configuration when a sensed voltage of a battery connected to the DC-DC converter is in a low voltage region, to configure the first bridge rectifier and the second bridge rectifier in the parallel rectifier configuration when the sensed voltage is in a nominal voltage region, and to configure the first bridge rectifier and the second bridge rectifier in the series rectifier configuration when the sensed voltage is in a full voltage region.

2. The system of claim 1, wherein the one or more secondary configuration switches include a first secondary configuration switch, a second secondary configuration switch, and a third secondary configuration switch.

3. The system of claim 2, wherein the controller is configured to control the operation of the one or more secondary configuration switches to configure the first bridge rectifier and the second bridge rectifier in the single rectifier configuration by controlling the first secondary configuration switch to be open, the second secondary configuration switch to be open, and the third secondary configuration switch to be closed.

4. The system of claim 2, wherein the controller is configured to control the operation of the one or more secondary configuration switches to configure the first bridge rectifier and the second bridge rectifier in the parallel rectifier configuration by controlling the first secondary configuration switch to be closed, the second secondary configuration switch to be open, and the third secondary configuration switch to be closed.

5. The system of claim 2, wherein the controller is configured to control the operation of the one or more secondary configuration switches to configure the first bridge rectifier and the second bridge rectifier in the series rectifier configuration by controlling the first secondary configuration switch to be open, the second secondary configuration switch to be closed, and the third secondary configuration switch to be open.

6. The system of claim 1, wherein the controller is further configured to control the operation of the bridge driver to operate into each of a half-bridge driver configuration and in a full-bridge driver configuration.

7. The system of claim 1, wherein the controller is further configured to turn off switches of the second bridge rectifier in the single rectifier configuration.

8. The system of claim 1, wherein the DC-DC converter has a voltage operating range from approximately 170V to approximately 850V at a battery interface connected to the first bridge rectifier and the second bridge rectifier.

9. The system of claim 1, further comprising an alternating current (AC) to direct current (DC) Power Factor Correction (PFC) converter connected to the bridge driver to provide the system as a battery charger.

10. The system of claim 9, further comprising:
    a battery connected to the DC-DC converter of the battery charger.

11. The system of claim 10, wherein the battery charger is configured to:
    receive input AC power through the PFC converter, convert the AC power to DC power, and provide the DC power to the battery to charge the battery, and
    receive DC power from the battery through the DC-DC converter, convert the DC power to AC power, and provide the AC power through the PFC converter as output AC power.

12. The system of claim 1, wherein the one or more transformers include one or more high-frequency transformers provided in a resonant tank including one or more of a multiple winding transformer or multiple transformers.

13. A method for controlling a system including a direct current (DC) to DC converter (DC-DC converter) including one or more transformers, a bridge driver, a first bridge rectifier, a second bridge rectifier, and one or more secondary configuration switches, the method comprising performing, by a controller, operations including:

controlling a switching operation of the one or more secondary configuration switches to configure the first bridge rectifier and the second bridge rectifier into each of a single rectifier configuration, a parallel rectifier configuration, and a series rectifier configuration, wherein the controlling the switching operation of the one or more secondary configuration switches to configure the first bridge rectifier and the second bridge rectifier in the single rectifier configuration includes turning off switches of the second bridge rectifier.

14. The method of claim 13, wherein the operations further include receiving a sensed voltage of a battery connected to the DC-DC converter, and wherein the controlling the switching operation includes controlling the switching operation to configure the first bridge rectifier and the second bridge rectifier in the single rectifier configuration when the sensed voltage is in a low voltage region, to configure the first bridge rectifier and the second bridge rectifier in the parallel rectifier configuration when the sensed voltage is in a nominal voltage region, and to configure the first bridge rectifier and the second bridge rectifier in the series rectifier configuration when the sensed voltage is in a full voltage region.

15. The method of claim 13, wherein the operations further include controlling the operation of the bridge driver to operate in each of a half-bridge driver configuration and in a full-bridge driver configuration.

16. The method of claim 13, wherein the controlling the switching operation further includes:

receiving input AC power, converting the AC power to DC power, and providing the DC power to a battery to charge the battery, and receiving DC power from the battery, converting the DC power to AC power, and providing the AC power as output AC power.

17. A non-transitory computer readable medium storing instructions that, when executed by one or more processors, perform operations including:

controlling a switching operation of one or more secondary configuration switches to configure a first bridge rectifier and a second bridge rectifier of a direct current (DC) to DC converter (DC-DC converter) into each of a single rectifier configuration, a parallel rectifier configuration, and a series rectifier configuration, wherein the controlling the switching operation further includes:

receiving input AC power, converting the AC power to DC power, and providing the DC power to a battery to charge the battery, and receiving DC power from the battery, converting the DC power to AC power, and providing the AC power as output AC power.

18. The non-transitory computer readable medium of claim 17, wherein the operations further include: controlling the operation of a bridge driver of the DC-DC converter to operate in each of a half-bridge driver configuration and in a full-bridge driver configuration.

19. The non-transitory computer readable medium of claim 17, wherein the controlling the switching operation of the one or more secondary configuration switches to configure the first bridge rectifier and the second bridge rectifier in the single rectifier configuration further includes: turning off switches of the second bridge rectifier.

20. A method for controlling a system including a direct current (DC) to DC converter (DC-DC converter) including one or more transformers, a bridge driver, a first bridge rectifier, a second bridge rectifier, and one or more secondary configuration switches, the method comprising performing, by a controller, operations including:

controlling a switching operation of the one or more secondary configuration switches to configure the first bridge rectifier and the second bridge rectifier into each of a single rectifier configuration, a parallel rectifier configuration, and a series rectifier configuration; and controlling the operation of the bridge driver to operate in each of a half-bridge driver configuration and in a full-bridge driver configuration.

* * * * *